Nov. 6, 1923.  
J. G. KAEFER  
DISPENSING DEVICE  
Filed Dec. 13, 1921  
1,473,187
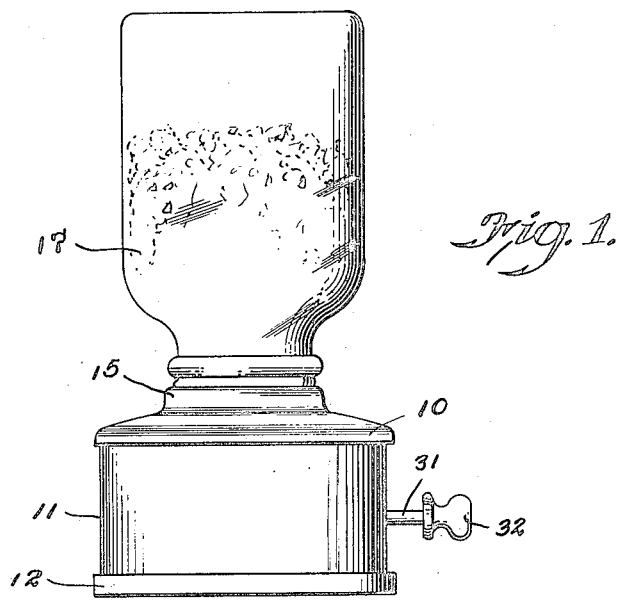
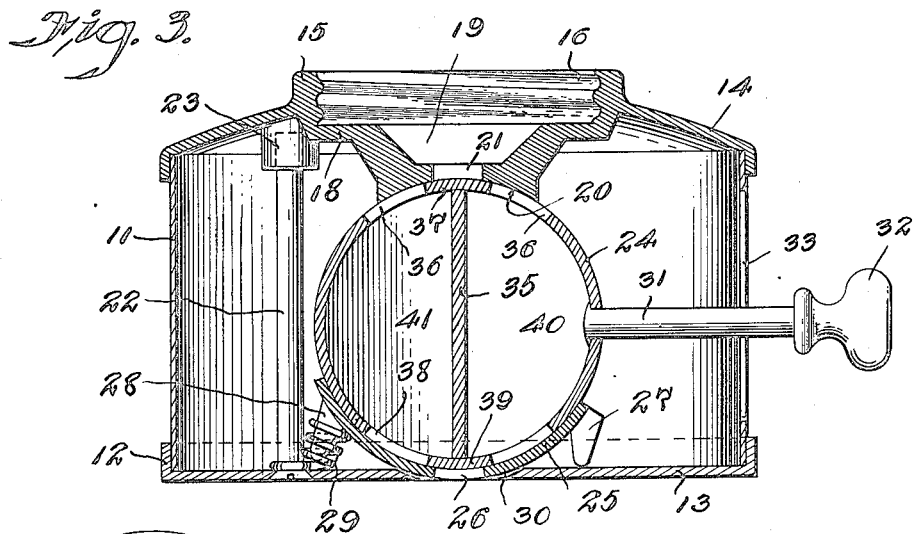
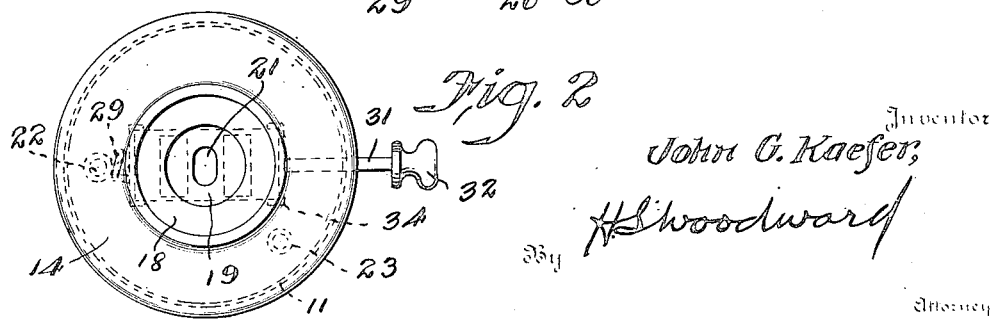
Inventor  
John G. Kaefer,  
By H. S. Woodward  
Attorney Patented Nov. 6, 1923.

1,473,187

UNITED STATES PATENT OFFICE.

JOHN G. KAEFER, OF OAKLEY, OHIO.

DISPENSING DEVICE.

Application filed December 13, 1921. Serial No. 522,010.

*To all whom it may concern:*

Be it known that I, JOHN G. KAEFER, a citizen of the United States, residing at Oakley, suburb of Cincinnati, in the county of Hamilton and State of Ohio, have invented certain new and useful Improvements in Dispensing Devices, of which the following is a specification.

The invention has for an object to effect improvements in valves and dispensing apparatus particularly. While the device is applicable to many uses, in the present embodiment it is shown as a coffee dispensing or measuring device, arranged to measure and dispense ground coffee in unit quantities, each unit being sufficient to make one cup of coffee, although the size of my device may be variously proportioned to suit varied requirements. It is an aim to enable the manufacture of such a device at an extremely low cost while yet being durable and efficient. It is a further purpose to so arrange the device that the aroma of coffee, tea, or other products may be retained, notwithstanding that the device is always ready for instant discharge of material therein, upon operation of a simple lever. A further important aim of the invention is to improve the mounting of a measuring device in the form of a supported rotating cylinder adapted to alternately receive and discharge a filling of the material to be dispensed. It is a particular object to give an extremely simple and easily produced device for insuring the close fit of a valve element upon two seats, which will at the same time serve to compensate for wear in the device. It is an aim to provide a novel and useful form in the measuring element whereby at each oscillation, a measured quantity of the contents of the device will be discharged. It is also an aim to enable the user to always known when the contents require replenishing, and to enable easy replenishment of the contents without spilling material from the device.

Additional objects, advantages and features of invention reside in the construction, arrangement and combination of parts as will appear from the following description, and accompanying drawings, wherein—

Figure 1 is an elevational view of the device,

Fig. 2 is a top view of the base element.

Fig. 3 is an enlarged sectional view of the base element and dispensing means.

There is illustrated a measuring and dispensing device comprising a case 10, including a cylindrical wall part 11 set within a circumscribing flange 12 of a base plate 13, the wall 11 being preferably of sheet metal formed to the proper size while the plate 13 may be cast or pressed from ductile metal as desired. Upon the wall 11 there is set a top 14 flanged to receive the wall 11 and preferably cast, a central upward extension 15 being formed concentrically thereon having interior rounded threads 16 adapted to permit a fruit jar or the like to be screwed thereinto, as shown at 17 in Fig. 1. The jar within the element 15 is limited in its entry by an integral stop plate 18 recessed centrally as at 19 and formed with a downwardly extending part having a lower face in the form of a segment of a cylinder, providing a seat 20 through which an inlet port 21 opens from the recess 19. The plate 13 is secured to the top 14 by tie screws 22 counter-sunk in the plate 13 and threaded in suitable bosses 23 formed upon the top 14.

A measuring element 24 is provided, a sheet metal box of cylindrical form, snugly fitted to the seat 20 before mentioned, and held to this seat by a ported seat plate 25 arranged to bear resiliently upon the element 24 at its lower side. The plate 25 has a central port 26 therein located diametrically opposite the port 21 before mentioned, and the plate 25 has at one end a heel element 27 which extends downwardly therefrom and rests upon the plate 13 as a fulcrum, the opposite end of the plate 25 being provided with one or more nibs 28 projecting downwardly sufficiently to engage slightly within the upper end of a spring 29 in each instance, the spring resting upon the plate 13, one coil of the spring being engaged around the screw 22. The plate 25 will thus be supported resiliently, and the measuring box 24 is also suitably held to the seat 20 at the upper side of the box. The plate 25 is smoothly finished upon the upper side so as to fit snugly to the box 24. The bottom plate 13 is in the present instance formed with an opening 30, and the plate is formed so as to receive a part of the plate 25 within the opening 30, whereby casual displacement of the measuring box from the seat 20, in case the device is dropped or the operating handle struck, will be obviated. The box 24 is provided with an operating lever 31 having a handle 32 at the outer end, the lever being extended through a vertical slot 33 of suitable extent formed in the wall 11 of the case. The box 24 is provided with a closed head 34 and is divided diametrically by a partition 35, which, when the lever 31 extends horizontally is disposed vertically and intermediately of the ports 21 and 26. Inlet ports 36 are formed closely adjacent the partition, an intervening part 37 of the box 24 being left to serve as a closure for the port 21 at times. Corresponding outlet ports 38 are formed in the lower side of the box 24, the intervening part 39 serving to close the port 26 at the intermediate position of the box. With the lever 31 at the upper limit of its movement, the right hand measuring chamber 40 in the box 24 will be filled through the port 21 and port 36, while the left hand chamber 41 will be emptied through the port 38 and port 26. With the lever 31 at its lower limit of movement, the action will be the opposite to that described.

What is claimed:—

1. In a device of the character described, a cylindrical casing element, a top and bottom fitting respective parts of the casing for retention by compression, assembly fastenings connecting the top and bottom, the bottom having a central discharge opening, and the top having an inlet port, a rocking measuring device having ports therein positioned for alternative registration with respective first named ports, and means to move the measuring device for alternate registration of the first and second named ports.

2. A device of the character described comprising an upper ported member, a ported measuring device fitted slidably over the port, for registration of the ports at times, said device having a discharge port opposite the inlet port, a base, a yielding supported closure element carried thereby in bearing upon the measuring device and having a port arranged to register with said discharge port when the other said port of the measuring element is out of alinement with the port of the first named ported member.

3. A member having an inlet port, a measuring element circular in cross section bearing upon the first named member, said first named member having a seat face around the port conforming to the measuring element, said measuring element having a port positioned for alinement with the inlet port at times, a base element, a lower ported plate conforming to the shape of the measuring element and having a heel part resting upon the base at one side of the port in the plate, and a resilient support engaging the plate on the opposite side of said port from the heel, said measuring element being movable to bring a port thereof into alinement with the port of said plate at times, whereby it may be alternately filled from the inlet port and discharged through said plate, and means to rock the measuring element.

4. A measuring device of the character described comprising an upper element centrally ported and having a lower cylindrical seat surface adjacent the port, a cylindrical measuring device snugly fitted to the seat and rotatable thereagainst, a base element, a cylindrical segment fitted to the measuring element opposite the first named member and having a heeled part upon one side of a diametrical plane intersecting the first mentioned port, and a spring element confined between the base and opposite end of said plate, and means to rock the measuring element, said measuring device having ports therein for alternate registration with the inlet and outlet ports respectively.

5. In a valve device, a valve element circular in cross section, a ported seat snugly fitted thereto at one side, a second ported element snugly fitted to the valve at the opposite side, a rest element fixed with relation to the first ported element, said second named ported element having a heel portion upon the rest at one side of the port, and resilient means to support the second named element at the opposite side of the port.

In testimony whereof I have affixed my signature in presence of two witnesses.

JOHN G. KAEFER.

Witnesses:
H. C. STANFORTH,
CHAS. T. ROSE.